No. 12,344. REISSUED MAY 9, 1905.

T. SUTERS.

FOLLOWER BLOCK FOR CARD INDEXES.

APPLICATION FILED APR. 12, 1905.

Witnesses

C. F. Raeder

J. Stewart Rice.

Inventor:

Thomas Suters,

By Dodge and Sons,

Attorneys

PHOTO-LITHOGRAPHED BY SACKETT & WILHELMS LITHO. & PT'G. CO. NEW YORK.

No. 12,344. Reissued May 9, 1905.

UNITED STATES PATENT OFFICE.

THOMAS SUTERS, OF ILION, NEW YORK, ASSIGNOR TO TUCKER FILE & CABINET COMPANY, OF ILION, NEW YORK, A CORPORATION OF NEW YORK.

FOLLOWER-BLOCK FOR CARD-INDEXES.

SPECIFICATION forming part of Reissued Letters Patent No. 12,344, dated May 9, 1905.

Original No. 783,154, dated February 21, 1905. Application for reissue filed April 12, 1905. Serial No. 255,255.

*To all whom it may concern:*

Be it known that I, THOMAS SUTERS, a citizen of the United States, residing at Ilion, in the county of Herkimer and State of New York, have invented certain new and useful Improvements in Follower-Blocks for Card-Indexes, of which the following is a specification.

My present invention pertains to improvements in follower-blocks for card-indexes and the like, the construction and advantages of which will be hereinafter set forth, reference being had to the annexed drawings, wherein—

Figure 1:
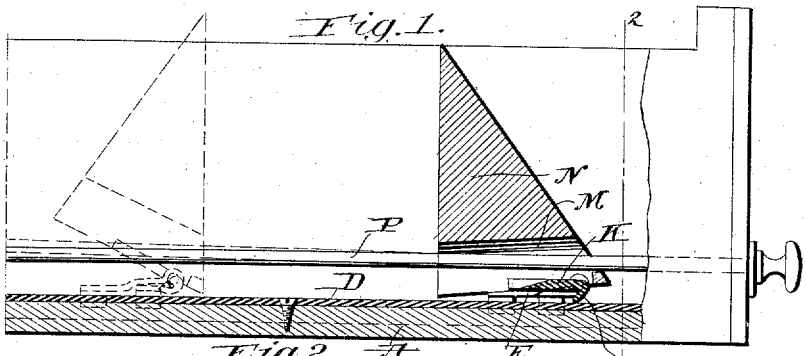
Figure 2:
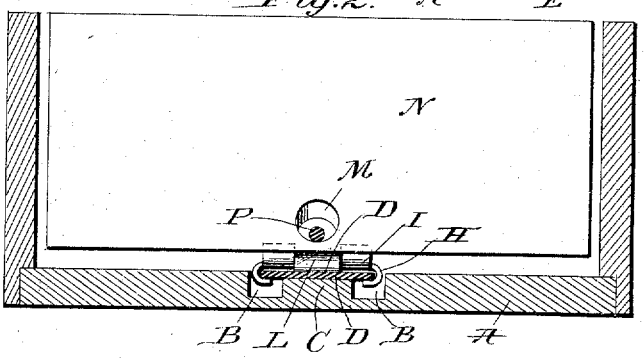
Figure 3:
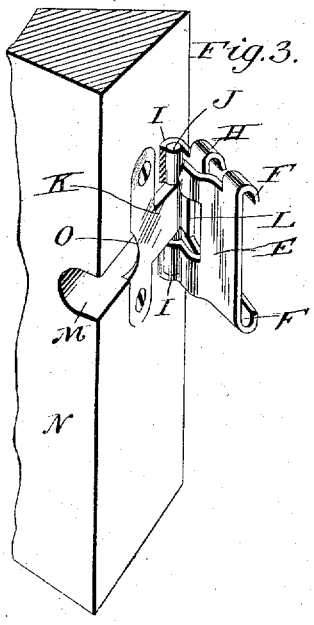
Figure 4:
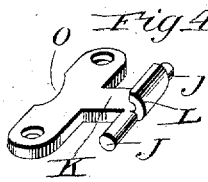
Figure 5:
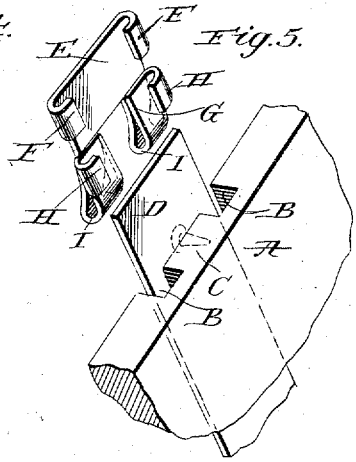

Figure 1 is a longitudinal sectional view of a portion of a drawer, showing my invention applied thereto; Fig. 2, a transverse sectional view on the line 2 2 of Fig. 1; Fig. 3, a perspective view of the under face of the follower, showing the guiding and locking mechanism; Fig. 4, a perspective view of the combined pintle and cam locking-plate; and Fig. 5, a perspective view of the under face of the slide, a portion of the bottom of the drawer, and the guide-rail.

The object of the present invention is to provide a simple and efficient guide and lock for a follower-block—one which contains but few parts and may be readily manufactured and which is likewise simple of operation.

Referring to the drawings, A denotes the bottom of a drawer provided with two longitudinally-extending channels B B, with an intermediate ridge C, the upper face of the ridge lying in a plane below the upper face of the bottom of the drawer. A guide rail or strip D is secured to the upper portion of the ridge-piece, the top face thereon lying flush with the bottom of the drawer and its edges stopping short of the outer side walls of the channels B. This is the usual or ordinary construction and affords an overhanging rail in the bottom of the drawer, upon which the slide of the follower-block is mounted and travels and in the present case may be positively locked at any desired position in the length thereof. The slide (best shown in Figs. 3 and 5) is formed of a single piece of sheet metal and comprises a cross bar or body E, provided with two inturned fingers F F and two parallel arms G G, which are folded back upon themselves and provided with inturned fingers H H, which stand in alinement with the corresponding fingers F F. As will be noted upon reference to the drawings, arms G G are deflected to a slight extent at the point of junction with the body portion, so that the returned ends of said arms lie substantially flush with the under face of the body E. Arms G at the point where they are bent upon themselves are separated, the bend being curved, thereby forming loops or eyes I for the reception of pintles J J, formed as a part of or carried by a plate K. Said plate K is T-shaped, the pintles extending laterally from the stem thereof, which latter also carries, preferably as an integral part thereof, a locking cam or projection L. The stem of the plate overlies an opening M, formed in the lower face of the follower-block N, while the head of the plate is seated and secured in a recess formed in the under face of the block for its reception. (See Fig. 3.) Plate K is, under the proportion of the parts shown, cut away slightly, as at O, Fig. 3, in order that it may not come into contact with the card-threading rod P when the block is swung forward or into its unlocked position, as shown in dotted lines.

The slide when in position is held in engagement with the guide-rail by the fingers H and F, which pass around the edge of the rail and beneath the same to a slight extent, the proportion of the parts being such that the slide may be moved freely upon the rail unless the fingers are drawn up into close contact with the under face thereof. This contact is effected by moving the block into its upright position, as shown in full lines, Fig. 1, at which time the cam L will bear directly upon the upper face of the guide-rail D, thereby elevating the block and likewise drawing the fingers of the guide up into binding engagement with the under face of the rail.

It is to be noted that the guide and locking-plate are each formed of a single piece of metal, (in the form illustrated,) that there are no loose parts to become disengaged, and that no springs are employed. The construction, in effect, is a hinge, one part carrying a cam which when brought into action serves to positively lock the sliding hinge member to its support.

The rod P is not essential, as the follower, with the locking device, may be used in connection with constructions in which no rod is employed.

It is evident that any form of rail or guide may be employed in connection with the slide and locking device, and the invention is not limited to the particular form of rail or guide herein shown.

Having thus described my invention, what I claim is—

1. In combination with a guide-rail; a slide mounted thereon; a follower-block connected thereto; and means carried by the block adapted and arranged to positively lock the slide to the rail as the block is swung from an inclined to a vertical position.

2. In combination with a guide; a slide mounted and movable thereon; a follower-block hinged to the slide; and means carried by the block for causing the slide to engage the guide as the block is rocked to its normal position.

3. In combination with a guide; a slide mounted and movable thereon; a follower-block hinged to the slide; and a cam carried by the block, said cam coming into action to cause the slide to engage the rail as the block is moved into its normal position.

4. In combination with a guide; a follower-block; a hinged connection between said guide and follower; and a cam carried by the block for raising the hinge with reference to the guide, whereby when the block is swung to its normal position the hinge will be locked to the guide.

5. In combination with a guide; a slide mounted thereon, said slide having fingers which extend beneath and bear upon the under face of the guide; a plate hinged to the slide and provided with a cam which normally rests upon the guide; and a follower-block secured to the plate, whereby the plate may be rocked to such position as to withdraw the cam and release the slide from locking engagement with the guide, substantially as described.

6. In combination with a guide-rail; a slide mounted thereon, said slide being formed of a single piece of metal and having fingers which pass beneath and engage the under face of the rail, and likewise formed with loops or eyes at one end; a plate provided with pintles which pass into said eyes, and with a cam which normally overlies the upper face of the guide-rail; and a follower-block secured to said plate.

7. In combination with a guide-rail; a slide mounted thereon, said slide being formed of a single piece of metal comprising a cross-bar with inturned fingers in line therewith; arms extended outwardly from said cross-bar, said arms being turned back upon themselves and forming loops or eyes, and being likewise provided with inturned fingers; a plate provided with pintles which pass into said eyes, and also formed with a cam or locking projection; and a follower-block secured to the plate.

In testimony whereof I have signed my name to this specification in the presence of two subscribing witnesses.

THOMAS SUTERS.

Witnesses:
ELVIN H. SHERMAN,
MENGE AMES.